2,992,116
PRODUCTION OF MEAT EMULSIONS
Louis Sair, Evergreen Park, Ill., assignor to The Griffith Laboratories, Inc., Chicago, Ill., a corporation of Illinois
No Drawing. Filed Mar. 27, 1961, Ser. No. 98,285
19 Claims. (Cl. 99—159)

The present invention relates to the production of meat emulsions, such as are commonly used in sausage and other encased meat products. The present application is a continuation-in-part of my earlier filed application Serial No. 12,693, filed March 4, 1960, now abandoned.

It has long been known that mild acidity is favorable to cured meat products, and especially to the color and permanence thereof. Fresh meat, in general, is mildly acid and has a natural pH in the range 5.8 to 6.3. The term "meat" as used herein comprehends lean and fat, and the meat used for emulsion always consists of lean and fat. The so-called emulsification of meat is the physical incorporation of the fat content as dispersed as finely divided particles with protein of the lean functioning as a part of, or as all of, the dispersing agent, with or without the presence of visual particles of lean meat.

Cured meat emulsions are more commonly made from mixtures of meat with a curing salt composition containing alkali metal nitrite with or without alkali metal nitrate. The cured products have a bright red color, the stability of which is important where the cured product is offered for sale. In particular, as exposed to light, the red color of curing, even after it is fixed by heat, as in smoking encased products, changes to a gray-brown which is unattractive to purchasers.

It is known that the water-binding capacity and the emulsifying qualities of the meat protein are related to the pH of the meat composition, and both are better, the higher the pH. In the pH range of 5.5 to 5.8, the said properties of the meat protein are appreciably lower than in the pH range of 6.0 to 6.2. The addition of certain alkali-metal salts of phosphoric acid is frequently practiced to neutralize the lactic acid of the meat and raise the pH to increase the water-binding capacity and emulsifying property. In consequence, edible acid has not been commercially employed in processing cured meat compositions to be emulsified, even though its contribution to color and stability of color may be beneficial.

The present invention aims to produce meat emulsions for a variety of meat products, which emulsions spontaneously increase in acidity after emulsification, and thereby provide a final meat emulsion containing free edible acid and having a pH lower than that prevailing during emulsification.

The present invention is based on the discovery of an edible agent which may be present in a meat composition being emulsified or to be emulsified, without adversely lowering the pH thereof during the emulsification process. The agent is an edible lactone which in the presence of water hydrolyzes forming edible organic acid. The agent is glucono delta lactone which readily, but sufficiently slowly, hydrolyzes to form gluconic acid.

It has been found that when said lactone is added to a meat mass to be emulsified, the spontaneous hydrolytic generation of acid is so retarded that the mass may be emulsified in a time-controlled period to yield substantially the same quality of emulsion as does the same meat mass without adding lactone. After the emulsion is formed, the generation of edible acid in it does not alter the initial quality of the emulsion, since by that time the fat has been subdivided to fine particles encased by protein. For example, a meat mass containing freshly added glucono delta lactone, and a similar mass containing an equivalent amount of gluconic acid yield, when both are quickly emulsified in about 20 minutes, relatively and respectively, excellent and poor emulsions, yet in about three hours, after completing the emulsion, they both have the same pH, and the same content of gluconic acid.

At about 40° F., which temperature characterizes meat in process, the hydrolysis of glucono delta lactone takes place at substantially the same rate in water and in a 5% by weight solution of sodium chloride, the latter being chosen because sodium chloride is commonly present in meat emulsions. Table I shows the titrations of two solutions, containing the same amount of glucono delta lactone (hereinafter referred to as GDL). To 100 ml. of water and to 100 ml. of a 5% solution of sodium chloride, were added 300 mg. of GDL, and then the two were titrated with 0.1 N solution of sodium hydroxide.

TABLE I

| Time | ml. Water | 0.1 N NaOH/NaCl |
|---|---|---|
| 10 minutes | 3.2 | 2.6 |
| 1 hour | 7.8 | 7.5 |
| 3 hours | 10.8 | 11.1 |

Table I shows that approximately 25% of the lactone hydrolyzes in the first ten minutes, and the remainder hydrolyzes more slowly over a three-hour period. Conventional apparatus for forming emulsions are used to emulsify in as short a time as one minute and as long a time as twenty to twenty-five minutes. The GDL or a composition containing GDL is preferably added last to a composition to be emulsified and then the emulsification is carried out as promptly as possible, and preferably in a period short of twenty-five minutes, thus to minimize an adverse content of free acid during the emulsification.

The meat mass to receiev the subject agent may be any of the known compositions to produce meat emulsions. Additional benefits from the final presence of gluconic acid are derived in cured products when there is also present an ene-diol compound, such as described in Hollenbeck U.S. No. 2,739,899, for example, ascorbic acid, or d-isoascorbic acid, or any of their water-soluble salts, among which are the sodium salts and the calcium salts.

In carrying out the invention, the GDL is used only in small quantity in a range upwardly from 0.5 ounce to 8 ounces or more of GDL per 100 pounds of meat. The quantity used may be added to the meat as a dry ingredient per se, or be included as a dry ingredient in a mixture of other dry ingredients, such as a mixture commonly used as a seasoning composition. Frequently, other additives are employed, and these may be separate ingredients or one or more mixtures commonly added separately from a curing salt mixture. Some of these additives are illustrated below, it being understood that they are not essential to the practice of the present invention in its broadest sense.

Although the preferred practice is to emulsify a comminuted meat mass containing GDL, it is to be understood that the meat mass to receive the GDL may be partially emulsified, or be a comminuted meat mass not as far advanced as an emulsion. The GDL, for example, may be added to the contents of a silent cutter at any stage, such as in its coarse comminuting stage, or its emulsifying stage. In the case of a slow-acting emulsification process, the GDL may best be added late in the process so that the final emulsification is completed in an appreciable time prior to the completion of the hydrolysis of the lactone, and preferably while a major portion of the GDL remains unhydrolyzed. In the case of a slow batch-processing in a silent cutter, the best results are effected by nearly completing the emulsification and then continuing the action by uniformly mixing into the contents the lactone. In the case of continuous processing in comminuting machines, or colloidal mills, the GDL is present in the composition continuously fed to the machine.

By simple procedure, the amount of GDL has been determined, which is equivalent to given amounts of various edible acids that are known and available for addition to meat compositions to be emulsified, or to meat emulsions. 100 mg. of the materials to be compared were dissolved in 100 ml. of water, and titrated with 0.1 N sodium hydroxide to attain a pH of 6. Before titrating the GDL, it was allowed to hydrolyze to equilibrium. Table II gives the titration values and the equivalency.

Column 1 is the material titrated to pH of 6.
Column 2 is the ml. used for the titration.
Column 3 is the calculated amount in ounces of the acid to be added to 100 lbs. of meat to impart acidity equivalent to 4 ounces of GDL.

TABLE II

| 1 | 2 | 3 |
|---|---|---|
| Anhydrous Citric Acid | 13.1 | 1.2 |
| Lactic acid (85%) | 8.0 | 1.95 |
| Gluconic acid (50%) | 1.75 | 9.0 |
| Glucono delta lactone [1] | 3.9 | 4 |

[1] Heated for two hours at 160° F.

The amounts of materials listed in Table II were then added to a test meat composition to be emulsified, and the emulsification effected in a standard procedure in 10 minutes with a 5-pound load. At fixed time periods, after the 10-minute emulsification, the pH of the emulsion was determined. Sausage casings were stuffed with the emulsion and smoked. The pH after smoking and the shrinkage in smoking were determined as reported in Table IV, for which the test composition is given in Table III.

TABLE III

| | |
|---|---|
| Lean beef (pH 6.40) lbs | 60 |
| Pork jowls (pH 6.00) lbs | 40 |
| Chipped ice lbs | 25 |
| Sodium chloride ozs | 34 |
| Curing salt ozs | 6 |
|   Sodium chloride 90% | |
|   Sodium nitrite 6% | |
|   Sodium nitrate 4% | |
| Bologna seasoning ozs | 12 |
| Sodium isoascorbate oz | 0.625 |

TABLE IV

Column 1 is item number.
Columns 2 and 3 are the test material and the ounces used for the compositions of Table III.
Columns 4 to 8 are the pH values of the emulsions at the minutes given, after the 10-minute emulsification.
Column 9 is the pH of the smoked sausage.
Column 10 is the percent shrinkage after smoking.

| 1 | 2 | 3 | 4 | 5 | 6 | 7 | 8 | 9 | 10 |
|---|---|---|---|---|---|---|---|---|---|
| | | oz. | 5 min. | 30 min. | 60 min. | 120 min. | 240 min. | | Percent |
| 1 | None (Control) | | 5.85 | 5.90 | 5.85 | 5.58 | 5.80 | 6.05 | 6.08 |
| 2 | GDL | 4 | 5.80 | 5.75 | 5.70 | 5.65 | 5.60 | 5.85 | 6.55 |
| 3 | Gluconic Acid (50%) | 9 | 5.65 | 5.60 | 5.60 | 5.65 | 5.62 | 5.85 | 7.05 |
| 4 | Lactic Acid (50%) | 1.95 | 5.60 | 5.65 | 5.65 | 5.70 | 5.65 | 5.88 | 7.26 |
| 5 | Citric Acid [1] | 1.20 | 5.58 | 5.66 | 5.65 | 5.65 | 5.68 | 5.90 | 7.78 |
| 6 | Citric Acid | 1.20 | 5.58 | 5.60 | 5.65 | 5.60 | 5.65 | 5.88 | 10.59 |

[1] Note special discussion.

In Table IV, the citric acid of item 5 was added immediately after completing the emulsification, and the same quantity in item 6 was added before emulsification. In both cases, the pH values are substantially identical, but the shrinkage is much greater in item 6, showing the adverse effect of emulsifying in the presence of the citric acid. The sausage of item 6 was soft and mushy and was eliminated from the following evaluation of color:

The smoked sausages were stored overnight at 45° F., and color values reported as follows:

*Skin color.*—No. 1 is red with a slight brownish cast, and the remainder were pinkish-red.

*Slice color.*—(a) Initially sliced, all had excellent color with No. 1 the least red. (b) After six hours' exposure to 40 foot-candle light, the control turned brown, No. 2 with GDL was best, and Nos. 3, 4 and 5 were better than the control. (c) After overnight storage at 40° F., the relationship remained unchanged. (d) After three days storage at 40° F., the relationship remained unchanged.

There are other lactones suggested by the advantages derived from GDL. The rates of hydrolysis of other lactones at 45–50° F., 100° F. and 200° F., have been determined and it has been found that GDL is distinctive. In particular, gluconic lactone, gamma galactonolactone, glucuronolactone and alpha glucoheptonic lactone are too slow to hydrolyze. For example, at 45° to 50° F., no appreciable hydrolysis takes place in water in 18 hours. At 100° F. and 200° F., some of these hydrolyze somewhat faster but to no advantage for the present invention.

The present invention basically concerns the pH of a meat composition during emulsification, which composition, after emulsification, has a lower pH and one such that had it prevailed during emulsification, the emulsion would be of poorer quality. As exemplified below, this result may be achieved in fresh or cured meat emulsions. Its value is greatest in cured meat emulsions wherein the texture and the red color of nitrite-curing and its stability are important commercial considerations in the merchandising of such products. In this field, the red color of nitrite-curing and its stability are well-known to be enhanced by various additives, in particular, an isomer of ascorbic acid or its edible salts, with or without a spice such as paprika.

The emulsification determines texture and yield, and the composition determines color and stability. Although it is customary to emulsify compositions containing the curing agent, cured sausage products may be made by adding the curing agent to the finished emulsion. The present invention leads to improved texture with or without curing salt present, but to avoid a second mixing, it is preferably carried out for cured meat products by including the nitrite curing said before the emulsification. Mixing operations after emulsification lead to adverse effects from oxygen of the air, and are avoided unless carried out in vacuum chambers.

*Example 1*

See item 2 of Table IV using 4 ounces of GDL to 100 lbs. of meat in the composition of Table III.

*Example 2*

*Pork sausage.*—A meat mass for pork sausage was prepared as follows:

| | |
|---|---|
| Pork trimmings lbs | 100 |
| Ice water lbs | 3 |
| Sodium chloride ozs | 26 |
| Seasoning ozs | 8 |

This was divided into portions A, B, C and D for emulsification and comparative tests with additions as follows:

A—control.
B—0.5 oz. GDL per 100 lbs. meat.

C—8 ozs. GDL per 100 lbs. meat.

D—19 ozs. gluconic acid (50%), equivalent to 8 ozs. GDL.

The pork trimmings were ground through a 1-inch plate, chilled, and then divided into four parts. Seasoning and salt, and a solution of GDL in the ice water, were added, and the whole comminuted through a 3/16-inch plate and then stuffed into casings.

At stated times after the additions, pH values were measured as given in Table V below:

TABLE V

|   | pH at Minute Periods |   |   |   |   |
|---|---|---|---|---|---|
|   | 5 | 30 | 60 | 120 | 240 |
| A | 5.8 | 5.7 | 5.6 | 5.8 | 5.7 |
| B | 5.9 | 5.7 | 5.8 | 5.7 | 5.6 |
| C | 5.55 | 5.6 | 5.4 | 5.4 | 5.3 |
| D | 5.1 | 5.2 | 5.2 | 5.2 | 5.2 |

The emulsion of D became very short and almost immediately assumed a gray color. The remaining emulsions were good quality and good color, 24 hours after preparation. Emulsion C in 4 hours converted its GDL to gluconic acid in quantity substantially the same as the quantity in emulsion D, and the final pH values were substantially the same. All but portion D remained at higher pH values during the period of emulsification, thus producing good quality emulsions.

*Example 3*

The following basic cured meat composition was employed:

Lean beef _____ 40 lbs.
Pork trimmings _____ 60 lbs.
Chipped ice _____ 25 lbs.
Sodium chloride _____ 34 ozs.
Curing salt _____ 6 ozs.
    Sodium chloride—90%
    Sodium nitrite—6%
    Sodium nitrate—4%
Bologna seasoning _____ 12 ozs.
Test material _____ (x in table below.)

The composition, as varied in Table VI, was emulsified in about 10 minutes and promptly stuffed into casings and smoked.

TABLE VI

| Example | Test Materials | x ounces | Color Development in smokehouse | | pH Sausage |
|---|---|---|---|---|---|
|   |   |   | 1st Hour | 2nd Hour |   |
| 3a | Control |   | Brown overall | Red overall | 5.95 |
| 3b | GDL | 4 | Reddish brown | do | 5.85 |
| 3c | GDL | 8 | More red than 3b | do | 5.80 |

The foregoing examples demonstrate that the use of GDL hastens the development of the red color of curing.

*Example 4*

The basic composition of Example 3 was used for the following comparisons:

TABLE VII

| Example | Test Materials | x ounces | pH Sausage | Sausage Color [1] |
|---|---|---|---|---|
| 4a | None (control) |   | 5.95 | 1 |
| 4b | Glucono delta lactone | 4 | 5.80 | 1.5 |
| 4c | {Glucono delta lactone / Sodium isoascorbate} | 4 / 0.875 | 5.78 | 3 |
| 4d | {Glucono delta lactone / Sodium ascorbate} | 4 / 0.875 | 5.76 | 3 |
| 4e | Sodium ascorbate | 0.875 | 5.98 | 2 |

[1] Higher number indicates better color.

The foregoing emulsions were made in 10 minutes in a silent cutter. The emulsions were stuffed into casings and placed in a smokehouse under conditions as follows:

1 hour at 160° F.
    1 hour at 170° F.
    1.5 hours at 185° F.

giving an internal temperature of 152° F. The smoked products were chilled in cold water to an internal temperature of 125° F., then tempered at room temperature of 75° F., for 30 minutes, then placed in a cooler at 45° F., for overnight storage. After the night storage, the sausage pH given above was determined.

Examples 4a and 4e, both without GDL, yield emulsions and finished sausage higher in pH than Examples 4b, 4c and 4d, which three examples have substantially identical pH values for the finished sausage.

The stability of the red color reported in the table above was tested by exposure by slices at 40° F., for 5 hours to 25 to 30 foot-candle light, and the colors designated B were compared. Then, the sausage slices at 40° F. were left for 5 additional hours, exposed to 25 to 30 foot-candle light, and the colors designated C were compared:

TABLE VIII

| Example | Color B | Color C |
|---|---|---|
| 4a | Gray | Very gray. |
| 4b | Pink-gray | Slight pinkish cast. |
| 4c | Bright red | Red. |
| 4d | do | Do. |
| 4e | Red | Slightly more pink than 4b. |

After three more days, the colors C of 4c and 4d retained a reddish cast while the other three were completely gray.

The presence of an excess of residual nitrite salt in cured meat products is objectionable under certain government regulations. The nitrite salt in curing should be converted to nitrosohemoglobin and nitroso-myoglobin. The lower the pH of the final product, in general, the less there is of residual nitrite salt. This would indicate the addition of edible acid, such as gluconic acid for example.

As shown above, the presence of such acid during emulsification leads to an emulsion of poor quality. When such acid is provided by initially using GDL according to the present invention, the final pH may be lowered without adverse effect on the emulsification. When this procedure is followed, it has been found that the residual nitrite salt is lower than when the GDL is omitted. In other words, the residual nitrite salt may be reduced by creating a lower final pH after emulsification by the presence of GDL during emulsification.

The following example illustrates:

*Example 5*

Bologna:
    Lean beef _____ lbs__ 40
    Pork trimmings _____ lbs__ 60
    Chipped ice _____ lbs__ 25
    Sodium chloride _____ ozs__ 34
    Curing salt _____ ozs__ 4
        Sodium chloride_____90%
        Sodium nitrite_____6%
        Sodium nitrate_____4%
    Sodium isoascorbate _____ oz__ 7/8
    Glucono delta lactone _____ x When $x=0$, the residual sodium nitrite was 50 parts per million. When $x=4$ ozs., the residual sodium nitrite was 31 parts per million.

The invention may be carried out in other types of compositions. Examples 6, 7 and 8 illustrate curing compositions in which the quantities of ascorbic acid and glucono delta lactone are varied from zero upwardly.

When using ascorbic acid in a composition for a cured meat composition, the amount of ascorbic acid is insufficient appreciably to change the pH during the emulsification in the presence of glucono delta lactone. This is demonstrated in the following Tables IX and X.

TABLE IX

A composition to be emulsified:

Leaf beef (pH 6.40) _____ lbs __ 60
Pork jowls (pH 6.00) _____ lbs __ 40
Chipped ice _____ lbs __ 25
Sodium chloride _____ ozs __ 34
Curing salt _____ ozs __ 4
    Sodium chloride _____ 90%
    Sodium nitrite _____ 6%
    Sodium nitrate _____ 4%
Ascorbic acid _____ ozs __ $x$
Glucono delta lactone _____ ozs __ $y$
Seasoning _____ ozs __ 12

These variations of the above composition were emulsified in less than five (5) minutes, and the pH values of the emulsion were taken at set periods after completing the emulsion as set forth in Table X.

TABLE X

*Example 6*

The composition of Table IX in which $x=$zero and $y=$zero.

*Example 7*

The composition of Table IX in which $x=\frac{3}{4}$ ounce ascorbic acid and $y=$zero (no lactone).

*Example 8*

The composition of Table IX in which $x=\frac{3}{4}$ ounce ascorbic acid and $y=3$ ounces glucono delta lactone.

pH OF EMULSION

| Time in Minutes | Example 6 | Example 7 | Example 8 |
|---|---|---|---|
| 5 | 5.7 | 5.7 | 5.7 |
| 30 | 5.7 | 5.8 | 5.8 |
| 60 | 5.7 | 5.6 | 5.35 |
| 120 | 5.6 | 5.7 | 5.4 |

In the absence of the lactone in Examples 6 and 7, the pH of the finished emulsion remains substantially constant. In Example 8, the pH is reduced by hydrolysis of the lactone, which is substantially completed in from 1 to 2 hours, allowing the ascorbated-nitrite cure to proceed in a more acid emulsion than in Example 7:

Color is an important charateritstic of the cured meat in encased meat emulsions. As set forth in my joint application with Komarik, Serial No. 12,692, filed March 4, 1960, the presence of a member of the capsicum family as seasoning participates in forming the color and the color is improved and more lasting when the emulsion is formed in the presence of glucono delta lactone.

Red pepper and paprika are members of the capsicum family imparting certain color characteristics. Red pepper has pronounced bite as well as color, and paprika has pronounced color and little bite. Thus, color and bite in a sausage, for example, may be varied greatly by variously mixing members of the capsicum family. This is done by selecting from ground natural forms and oleoresins derived therefrom.

The following is illustrative of the use of capsicum seasoning in variations of the usages of capsicum and of glucono delta lactone in the basic formula of Table XI.

TABLE XI

Lean beef _____ lbs __ 65
Pork jowls _____ lbs __ 35
Chipped ice _____ lbs __ 25
Sodium chloride _____ ozs __ 40
Dry corn syrup solids (D.E.=42) _____ ozs __ 32
Bologna seasoning _____ ozs __ 8
Curing salt _____ ozs __ 4
    Sodium chloride _____ 90%
    Sodium nitrite _____ 6%
    Sodium nitrate _____ 4%
Sodium isoascorbate _____ oz __ 1
Test material _____ ozs __

The test compositions were emulsified promptly after the inclusion of GDL, and the emulsion stuffed into casings (22 x 2¾ inches) and smoked as follows:

1 hour at 160° F.
    1 hour at 170° F.
    3 hours at 180° F.

Total, 5 hours to internal temperature of 152° F.

They were then chilled in cold water for 30 minutes to a temperature of 130° F., then after 30 minutes at room temperature, were placed in storage at 45° F. overnight.

The following Table XII gives the composition of the test sausages and the pH after smoking.

TABLE XII

| Example | Sausage No. | Test Material | ozs. | Finished Sausage pH |
|---|---|---|---|---|
| 9 | 1 | Paprika | 3.5 | 6.00 |
| 10 | 2 | Paprika / Glucono delta lactone | 3.5 / 4.0 | 5.80 |
| 11 | 3 | Oleoresin of paprika / Dextrose carrier | 6 cc. / 8 | 6.00 |
| 12 | 4 | Oleoresin of paprika / Dextrose base / Glucono delta lactone | 6 cc. / 8 / 4.0 | 5.8 |
| 13 | 5 | Red paper | 2.0 | 6.00 |
| 14 | 6 | Red pepper / Glucono delta lactone | 2.0 | 5.82 |

After the overnight storage slices of the sausages were exposed for seven hours to light of 25 to 30-foot candles, and those having GDL retained more color than the controls. They were then covered against the light and stored overnight, when they still showed more color than the controls. They were then exposed for eight hours to light of 25 to 30 foot-candles, and the color then elevated as shown in Table XIII.

TABLE XIII

| Example | Sausage Slices | Coloring |
|---|---|---|
| 9 | No. 1 | Brown with slight orange cast. |
| 10 | No. 2 | Red with the most orange cast. |
| 11 | No. 3 | Brown with slight yellow cast. |
| 12 | No. 4 | Red with slight orange cast. |
| 13 | No. 5 | Brown with slight yellow cast. |
| 14 | No. 6 | Red with slight orange cast. |

Then the slices were again covered from the light and stored overnight, and the color values remained as reported in Table XIII.

Although all the sausages of Examples 9 through 14 were made with sodium isoascorbate, the control members showed very little recovery of color after the fading by light exposure.

The combined effect of using the GDL and the capsicum was tested, both with and without the presence of ene-diol compound. It was found that improvement in color is effected in both cases, however, more so when the ene-diol compound is present, as shown in Examples 15 through 18.

Using the meat composition and procedure set forth in Table XI, both omitting and including sodium isoascorbate, comparative compositions were produced as set forth in Table XIV, which gives the pH of the sausage after smoking.

TABLE XIV

| Example | Sausage No. | Test Material | ounces | Finished Sausage pH |
|---|---|---|---|---|
| 15 | 1 | Paprika | 4 | 6.20 |
| 16 | 2 | Paprika / Glucono delta lactone | 4 / 4 | 6.00 |
| 17 | 3 | Paprika / Sodium Isoascorbate | 4 / ⅞ | 6.20 |
| 18 | 4 | Paprika / Sodium Isoascorbate / Glucono delta lactone | 4 / ⅞ / — | 6.00 |

After the smoking, the sausages were chilled in water for 30 minutes to a temperature of 130° F., then placed in storage at 45° F. overnight plus 24 hours. Then slices of the sausages were cut and laid side by side on wax paper base and overwrapped with cellophane. The so-covered slices were then exposed for seven hours to light of 25 to 30 foot-candles and color again evaluated as given in Table XV. They were then covered from light and stored overnight, and again evaluated as in Table XV.

TABLE XV

| Example | Sausage Slice | After Light | After Light and Storage |
|---|---|---|---|
| 15 | No. 1 (Control) | Brown | Brown. |
| 16 | No. 2 | Reddish brown | Reddish brown. |
| 17 | No. 3 | More red than 2 | Increased red over 2. |
| 18 | No. 4 | Most red | Reddest. |

The slices were then held for four additional days with exposure to about 10-foot-candle light, and the colors remained substantially unchanged.

It is quite important that the glucono delta lactone be free from any substantial quantity of moisture. Therefore, inasmuch as it is also desirable to provide the material in highly comminuted form, it is preferred to include with the glucono delta lactone in a dry comminuted composition a stabilizing proportion of edible preferential moisture absorbing material, such as paprika, sodium chloride, sugar, proteins, curing salt, or the like.

In the following exemplary compositions, the parts by weight are suitable for use with 1600 parts of meat.

TABLE XVI

| Composition No. | 1 | 2 | 3 | 4 | 5 | 6 | 7 |
|---|---|---|---|---|---|---|---|
| Glucono delta lactone | 3 | 4 | 4 | 3 | 3 | 4 | 4 |
| Sodium isoascorbate | .75 | | | | .75 | | |
| Sodium chloride | 1.25 | | | 1 | 13.75 | | |
| Paprika | | 4 | | | | | 3 |
| Sodium caseinate | | | 44 | | | | |
| Sodium proteinate [1] | | | | | | 44 | |
| Curing salt [2] | | | | 4 | | | |
| Anhydrous corn sugar | | | | | | | 1 |
| Spice seasonings [3] | | | | | Taste | | |

[1] A soy protein, the product of U.S. Patent No. 2,881,076.
[2] 90% sodium chloride, 6% sodium nitrite, 4% sodium nitrate.
[3] May include oleoresins of capsicum and paprika.

Compositions such as those given above should be prepared and maintained as dry compositions in order that any incidental moisture content in them as prepared, or acquired after preparation, is inadequate to effect appreciable loss of the lactone by hydrolysis. The maximum permissible amount of water varies with the composition, because some ingredients hold the moisture in a manner less effective on the lactone than others. Also, the maximum permissible amount for each composition varies with the prescribed period of storage for prescribed packaging and prescribed environment of storage.

Although the conventional method of curing is by use of nitrite salt, cures may be expedited in ground meat or in meat emulsions by use of or generation of nitrogen oxide gases, such as nitric oxide and nitrogen dioxide or mixtures thereof, as set forth in Harper U.S. No. 2,930,703. The lowered pH effected by generation of gluconic acid in the case of cured meat products has a continuity of function in rendering the cured red color more stable against color changes on aging.

From the foregoing it will be appreciated that the invention is not limited to or by the examples above given by way of illustration, and numerous embodiments thereof are contemplated as falling within the scope of the appended claims.

I claim:

1. The method which comprises emulsifying a meat mass containing at least one-half ounce of glucono delta lactone per 100 pounds of meat, whereby gluconic acid forms thereafter in the resulting emulsion by hydrolysis of said glucono delta lactone.

2. The method which comprises adding a small quantity of glucono delta lactone to a meat mass to be emulsified, said lactone being present in amount of at least one-half ounce per 100 pounds of meat, and emulsifying the resulting mass prior to completion of the resulting hydrolysis of said lactone to gluconic acid, whereby lactone in the emulsion hydrolyzes and forms gluconic acid in the emulsion.

3. The method of claim 2 in which the meat mass is emulsified prior to any substantial hydrolysis of said lactone.

4. The method of emulsifying meat which comprises incorporating glucono delta lactone into a batch of meat mass in process of being emulsified in amount of at least one-half ounce of lactone per 100 pounds of meat, and completing the emulsification in the presence of added lactone, whereby lactone in the emulsion hydrolyzes and forms gluconic acid in the emulsion.

5. The method which comprises completing the emulsification of a meat composition comprising a small quantity of glucono delta lactone in the range from 0.5 to 8 ounces per 100 pounds of meat, whereby said lactone in the emulsion hydrolyzes to gluconic acid in the emulsion and lowers the pH of the emulsion.

6. The method which comprises emulsifying a meat mass containing nitrite-curing salt for forming a cured meat emulsion and containing at least one-half ounce of glucono delta lactone per 100 pounds of meat, and then curing the meat in the emulsion in the presence of the acid generated in the emulsion from said lactone.

7. The method which comprises adding a small quantity of glucono delta lactone to a meat mass containing nitrite-curing salt to be emulsified, said lactone being present in amount of at least one-half ounce per 100 pounds of meat, emulsifying the resulting mass prior to completion of the resulting hydrolysis of said lactone to gluconic acid, and then curing the meat in the emulsion in the presence of the acid generated in the emulsion from said lactone.

8. The method of claim 7 in which the meat mass is emulsified prior to any substantial hydrolysis of said lactone.

9. The method of emulsifying meat which comprises incorporating glucono delta lactone into a batch of meat mass containing nitrite-curing salt in process of being emulsified, the amount of said lactone being at least one-half ounce per 100 pounds of meat, and then curing the meat in the emulsion in the presence of the acid generated in the emulsion from said lactone.

10. The method which comprises emulsifying a meat mass containing nitrite curing salt for forming a cured meat emulsion, ene-diol compound for the nitrite-cure, and at least one-half ounce of glucono delta lactone per 100 pounds of meat, and then curing the meat in the emulsion in the presence of the acid generated in the emulsion from said lactone.

11. The method of claim 10 in which the meat mass is emulsified prior to any substantial hydrolysis of said lactone.

12. The method which comprises completing the emulsification of a cured-meat composition comprising nitrite-curing salt, ene-diol compound for the nitrite-cure, and a small quantity of glucono delta lactone in the range from 0.5 to 8 ounces per 100 pounds of meat, and then curing the meat in the emulsion in the presence of the acid generated in the emulsion from said lactone.

13. The method of claim 1 in which emulsification is carried out at a pH adapted for producing fine fat particles in said meat mass during emulsification thereof, but in the presence of sufficient glucono delta lactone to lower the pH after completion of the emulsion to a level substantially below that first-mentioned pH necessary for producing said fine fat particles in said emulsified mass.

14. The method of claim 6 in which emulsification is carried out at a pH adapted for producing fine fat particles in said meat mass during emulsification thereof, but in the presence of sufficient glucono delta lactone to lower the pH after completion of the emulsion to a level substantially below that first-mentioned pH necessary for producing said fine fat particles in said emulsified mass, whereby said lowered pH contributes to the color and the stability of the red color of a cured meat product.

15. The method of forming a cured meat product which comprises emulsifying a curable meat mass containing at least one-half ounce of glucono delta lactone per 100 pounds of meat at a pH adapted for producing fine fat particles in said meat mass during emulsification thereof, but in the presence of sufficient glucono delta lactone to lower the pH after completion of the emulsion to a level substantially below that first-mentioned pH necessary for producing said fine fat particles in said emulsified mass, and completing the cure of the meat with the formation of a cured red color in the presence of gluconic acid generated in the emulsion from said lactone whereby said lowered pH contributes to the color and the stability of the red color of the cured meat product.

16. The product resulting from the method of claim 1.

17. The product resulting from the method of claim 6.

18. The product resulting from the method of claim 10.

19. A composition for use in emulsifying meat, said composition comprising dry particles of glucono delta lactone plus a stabilizing proportion of edible preferential moisture adsorbent relative to said lactone whereby when a meat mass is emulsified with said composition, said meat mass containing at least one-half ounce of glucono delta lactone per 100 pounds of meat, gluconic acid forms in the resulting emulsion by hydrolysis of said glucono delta lactone.

References Cited in the file of this patent

UNITED STATES PATENTS

| | | |
|---|---|---|
| 2,627,473 | Brissey | Feb. 3, 1953 |
| 2,739,899 | Hollenbeck | Mar. 27, 1956 |
| 2,860,995 | Sair | Nov. 18, 1958 |

UNITED STATES PATENT OFFICE
CERTIFICATION OF CORRECTION

Patent No. 2,992,116                                  July 11, 1961

Louis Sair

It is hereby certified that error appears in the above numbered patent requiring correction and that the said Letters Patent should read as corrected below.

Column 1, line 17, for "pange" read -- range --; line 22, strike out "as"; column 2, TABLE I, the heading to columns 2 and 3 thereof should appear as shown below instead of as in the patent:

$$\frac{ml.}{Water} \quad \frac{0.1N}{NaCl} \quad \frac{NaOH}{}$$

column 4, line 25, for "gluconic" read -- gulonic --; line 54, for "said" read -- salt --; column 7, TABLE IX, line 2 thereof, for "Leaf beef" read -- Lean beef --.

Signed and sealed this 21st day of November 1961.

(SEAL)
Attest:

ERNEST W. SWIDER
Attesting Officer

DAVID L. LADD
Commissioner of Patents